Jan. 9, 1945.  H. VAN DER HORST  2,367,159
ELECTROLYTIC PROCESS OF MAKING PISTON RINGS
Filed Aug. 10, 1939

Inventor,
Henderik Van Der Horst,
By Frank S. Appleman,
Attorney.

Patented Jan. 9, 1945

2,367,159

UNITED STATES PATENT OFFICE 2,367,159

ELECTROLYTIC PROCESS OF MAKING PISTON RINGS

Henderik Van der Horst, Hilversum, Netherlands, assignor, by mesne assignments, to Van der Horst Corporation of America, a corporation of Delaware Application August 10, 1939, Serial No. 289,471
In Great Britain November 12, 1938

7 Claims. (Cl. 204—25)

This invention relates to improvements in piston-rings for internal combustion or other engines, pumps and the like.

Experimental tests have shown that the rate of wear of a cylinder bore in which a piston carrying cast-iron rings reciprocates can be considerably reduced by chromium-plating the peripheral surfaces of the rings, and the object of my invention is to provide a process whereby a substantially uniform coating of chromium can be obtained on the surface of a piston-ring without any sharp edges at which the chromium might be picked up or broken away when the ring is in use.

According to my invention the piston-rings are first machined and a groove is cut in the periphery of each ring at the point where the ring will ultimately be divided, and a number of rings are assembled together in exact axial alignment to form a cylinder.

A layer of chromium of the required thickness is then deposited electrolytically on the outer surface of this cylinder and the rings are separated and each is divided on the line of the groove. The chromium is not deposited in the groove and the deposit on each side of the groove is smoothly rounded off so that there is no sharp edge of chromium liable to pick up or break away.

As the rings are plated before they are divided they can be readily assembled into a cylinder with their outer surfaces in exact alignment so that the thickness of the layer of chromium deposited will be uniform, which would be practically impossible to obtain with divided rings.

With rings which are formed by cutting them off from a cylindrical piston-ring pot the chromium plating may be applied to the pot before the rings are cut off. In that case annular grooves are first cut in the pot on the lines where the piston rings will be cut off and a part-helical or inclined groove is cut where each individual ring will be ultimately divided.

Some practical ways of carrying out the invention are illustrated in the accompanying drawing in which—

Figure 1:
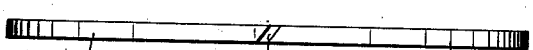
Figure 1 is a side elevation of a piston ring prepared for treatment.
Figure 2:
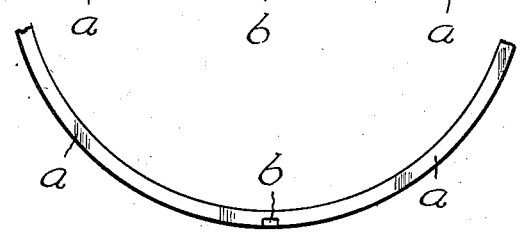
Figure 2 is a fragmentary plan of a part of the ring.

As shown in Figures 1 and 2 a ring $a$ is completely machined but is not divided and a groove $b$ of a depth less than the radial thickness of the ring is cut in the periphery of the ring at the point where the ring will ultimately be divided.

Figure 3:
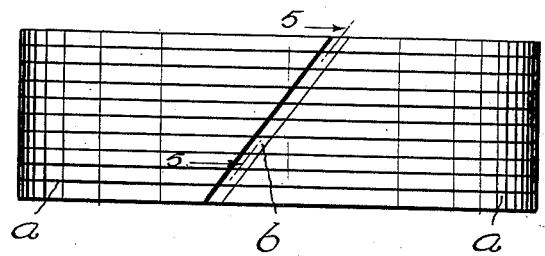
Figure 3 is a side elevation of a number of rings assembled together.

A number of rings are assembled together in exact axial alignment to form a cylinder as shown in Figure 3, and a layer of chromium is deposited electrolytically on the surface of the cylinder. The rings are then separated and each is divided on the line of the groove.

Figure 4:
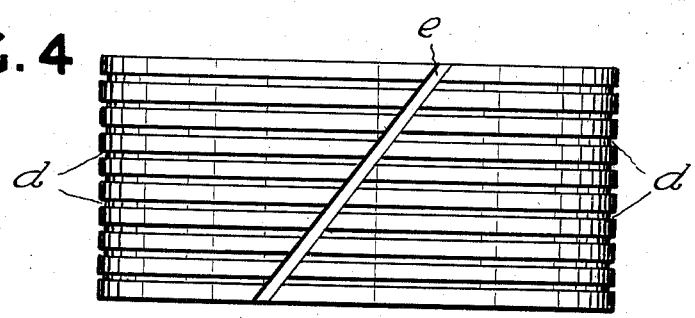
Figure 4 is a side elevation of a piston-ring pot ready for the deposition of chromium.
Figure 6:
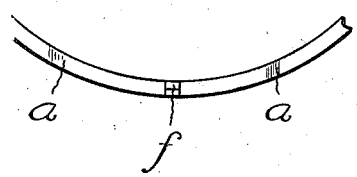
Figure 6 is a fragmentary section of a ring which has been divided and fitted with a filling before deposition of chromium.
Figure 5:
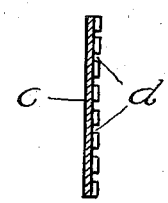
Figure 5 is a section on the line 5—5 of Figure 4.

In Figure 4 $c$ is a cylindrical piston-ring pot which is completely machined.

Annular grooves $d$ are cut in the surface of the pot on the lines where the individual rings will be cut off and an inclined groove $e$ is cut where the rings will be ultimately divided. A layer of chromium is deposited electrolytically on the surface of the pot and the rings are then cut off at the grooves $d$ and divided at the groove $e$.

When a ring has already been divided a filling piece $f$ of a radial thickness less than the radial thickness of the ring is inserted into the ring gap to hold the ring circular and to leave a groove in the outer surface. Rings so treated are then assembled into a cylinder as described with reference to Figure 3, a layer of chromium is deposited on the surface of the cylinder, and the rings are separated and the filling pieces are removed.

Figure 7:
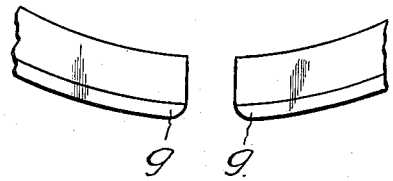
Figure 7 is a fragmentary plan on a larger scale of a finished ring.

With any of the above methods when the layer of chromium is deposited the chromium is not deposited in the groove, the grooves being of such widths that the deposit of chromium is discontinuous at the grooves, and the chromium on each side of the groove is smoothly rounded off as shown at $g$, $g$ in Figure 7 so that there is no sharp edge.

The thickness of the chromium in Figure 7 has been greatly exaggerated to make it clear.

I claim:

1. A process for producing piston rings having an electrolytically deposited layer of chromium on their peripheral surfaces consisting in forming a transverse groove in the periphery of each of a number of undivided rings, assembling a number of such rings together in exact axial alignment to form a cylinder, depositing a layer of chromium electrolytically on the surface of the cylinder, separating the rings, and dividing each ring on the line of the groove, said grooves being of such width that the deposit of chromium is discontinuous at the grooves.

2. A process for producing piston-rings having an electrolytically deposited layer of chromium on their peripheral surfaces in which the rings are formed by cutting them from a cylindrical piston-ring pot, consisting in cutting annular grooves in the peripheral surface of the pot on the lines where the rings will be cut off, cutting a longitudinally extending groove where the individual rings will be divided, depositing a layer of chromium on the surface of the pot, and cutting off and dividing the rings.

3. A process for producing piston-rings having an electrolytically deposited layer of chromium on their peripheral surfaces consisting in dividing each ring transversely, inserting a filling of a radial thickness less than the thickness of the ring in the gap to hold the ring circular and to leave a groove in the outer surface of the ring, assembling a number of such rings together in exact axial alignment to form a cylinder, depositing a layer of chromium electrolytically on the peripheral surface of the cylinder, separating the rings, and removing the fillings.

4. In the production of a piston ring having on its outer surface a layer of chromium without projecting sharp edges at the division ends of the ring, the step in the process which consists in electrolytically depositing chromium on the peripheral face of the ring while maintaining spaced from one another at least those portions of said ends which are adjacent the peripheral face of the ring, said portions being spaced such a distance that the chromium deposit is discontinuous across the space between them.

5. In the production of piston rings each having on its outer surface a layer of chromium, the steps which consist of providing an assembly of axially aligned ring bodies each having at the ring division point end surfaces at least adjacent its outer periphery, and electrolytically depositing chromium on the outer periphery of the assembly while maintaining said two end surfaces of each ring body separated to admit the flow of current into the spaces thus provided, said surfaces being spaced such a distance that the chromium deposit is discontinuous between them, thereby controlling the concentration of the current at the edges between such end faces and the peripheries of the ring bodies and depositing the chromium in at least no thicker layers at said edges than elsewhere.

6. In the production of a piston ring having on its outer surface a layer of chromium without projecting sharp edges at the division ends of the ring, the step in the process which consists in electrolytically depositing chromium on the peripheral face of the ring while maintaining spaced from one another at least those portions of said ends which are adjacent the peripheral face of the ring, and while having present between said ends, displaced radially inward from the peripheral face of the ring, metal forming a portion of the cathode, said portions of said ends being spaced such a distance that the chromium deposit is discontinuous between them.

7. In the production of piston rings each having on its outer surface a layer of chromium, the steps which consist of providing an assembly of axially aligned ring bodies each having at the ring division point end surfaces at least adjacent its outer periphery, and electrolytically depositing chromium on the outer periphery of the assembly while maintaining said two end surfaces of each ring body separated to admit the flow of current into the spaces thus provided, and while having present, displaced radially inward from said periphery, metal to receive current flowing into said spaces, said two surfaces being spaced such a distance that the chromium deposit is discontinuous between them, thereby controlling the concentration of the current at the edges between such end faces and the peripheries of the ring bodies and depositing the chromium in at least no thicker layers at said edges than elsewhere.

HENDERIK VAN DER HORST.